US009067241B2

(12) United States Patent
Hartsuiker et al.

(10) Patent No.: US 9,067,241 B2
(45) Date of Patent: *Jun. 30, 2015

(54) METHOD FOR CURING GLASS-FIBER COATINGS (71) Applicant: Draka Comteq, B.V., Amsterdam (NL)

(72) Inventors: Johannes Antoon Hartsuiker, Eindhoven (NL); Bob J. Overton, Capinghem (FR); Xavier Meersseman, Gravelines (FR)

(73) Assignee: Draka Comteq, B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/100,544

(22) Filed: Dec. 9, 2013

(65) Prior Publication Data

US 2014/0097361 A1 Apr. 10, 2014

Related U.S. Application Data (60) Continuation of application No. 13/663,662, filed on Oct. 30, 2012, now Pat. No. 8,604,448, which is a division of application No. 12/649,758, filed on Dec. 30, 2009, now Pat. No. 8,314,408.

(60) Provisional application No. 61/141,698, filed on Dec. 31, 2008.

(51) Int. Cl.
*G21K 5/04* (2006.01)
*B05D 3/06* (2006.01)
*C03C 25/12* (2006.01)
*C03C 25/62* (2006.01)

(52) U.S. Cl.
CPC .............. *B05D 3/067* (2013.01); *C03C 25/12* (2013.01); *C03C 25/6226* (2013.01)

(58) Field of Classification Search
USPC ....... 427/513; 65/441; 430/111.2; 250/491.1, 250/492.1, 493.1, 504 R
See application file for complete search history.

(56) References Cited

U.S. PATENT DOCUMENTS

| 3,737,051 | A | 6/1973 | Horino |
| 3,784,836 | A | 1/1974 | Tolliver |
| 3,800,160 | A | 3/1974 | Ishizawa et al. |

(Continued)

FOREIGN PATENT DOCUMENTS

| DE | 2911410 A1 | 9/1980 |
| DE | 4226344 A1 | 2/1994 |

(Continued)

OTHER PUBLICATIONS

U.S. Appl. No. 12/098,804 for a "Transmission Optical Fiber Having Large Effective Area," Sillard et al., filed Apr. 7, 2008, pp. 1-45.

(Continued)

*Primary Examiner* — Nicole Ippolito
(74) *Attorney, Agent, or Firm* — Additon, Higgins & Pendleton, P.A.

(57) ABSTRACT

A UVLED apparatus and method provide efficient curing of an optical-fiber coating onto a drawn glass fiber. The apparatus and method employ one or more UVLEDs that emit electromagnetic radiation into a curing space. An incompletely cured optical-fiber coating, which is formed upon a glass fiber, absorbs emitted and reflected electromagnetic radiation to effect improved curing.

19 Claims, 5 Drawing Sheets (56) References Cited

U.S. PATENT DOCUMENTS

| | | |
|---|---|---|
| 3,819,929 A | 6/1974 | Newman |
| 3,983,039 A | 9/1976 | Eastland |
| 4,010,374 A | 3/1977 | Ramler |
| 4,033,263 A | 7/1977 | Richmond |
| 4,070,499 A | 1/1978 | Ramier et al. |
| 4,145,136 A | 3/1979 | Takahashi |
| 4,309,452 A | 1/1982 | Sachs |
| 4,321,073 A | 3/1982 | Blair |
| 4,334,733 A | 6/1982 | Takeshima et al. |
| 4,479,984 A | 10/1984 | Levy et al. |
| 4,490,410 A | 12/1984 | Takiyama et al. |
| 4,518,628 A | 5/1985 | Biswas et al. |
| 4,591,724 A | 5/1986 | Fuse |
| 4,636,405 A | 1/1987 | Mensah et al. |
| 4,683,525 A | 7/1987 | Camm |
| 4,710,638 A | 12/1987 | Wood |
| 4,761,168 A | 8/1988 | Blyler, Jr. et al. |
| 4,774,104 A | 9/1988 | Severijns et al. |
| 4,838,643 A | 6/1989 | Hodges et al. |
| 4,839,513 A | 6/1989 | Wijtsma |
| 4,844,604 A | 7/1989 | Bishop et al. |
| 4,853,021 A | 8/1989 | Soszka et al. |
| 4,910,107 A | 3/1990 | Kawanda et al. |
| 4,913,859 A | 4/1990 | Overton et al. |
| 4,962,992 A | 10/1990 | Chapin et al. |
| 4,980,701 A | 12/1990 | Contois et al. |
| 4,990,971 A | 2/1991 | Le Creff |
| 5,062,723 A | 11/1991 | Takeda et al. |
| 5,146,531 A | 9/1992 | Shustack |
| 5,208,645 A | 5/1993 | Inoue et al. |
| 5,219,623 A | 6/1993 | Petisce |
| 5,278,432 A | 1/1994 | Ignatius et al. |
| 5,278,482 A | 1/1994 | Bahn |
| 5,366,527 A | 11/1994 | Amos et al. |
| 5,405,657 A | 4/1995 | Bastian et al. |
| 5,418,369 A | 5/1995 | Moore et al. |
| 5,420,768 A | 5/1995 | Kennedy |
| 5,427,862 A | 6/1995 | Ngo et al. |
| 5,440,137 A | 8/1995 | Sowers |
| 5,440,660 A | 8/1995 | Dombrowski et al. |
| 5,535,673 A | 7/1996 | Bocko et al. |
| 5,574,816 A | 11/1996 | Yang et al. |
| 5,633,123 A | 5/1997 | Hill et al. |
| 5,634,711 A | 6/1997 | Kennedy et al. |
| 5,660,461 A | 8/1997 | Igatius et al. |
| 5,712,487 A | 1/1998 | Adachi et al. |
| 5,717,805 A | 2/1998 | Stulpin |
| 5,731,112 A | 3/1998 | Lewis et al. |
| 5,733,607 A | 3/1998 | Mangum et al. |
| 5,756,165 A | 5/1998 | Ali et al. |
| 5,761,362 A | 6/1998 | Yang et al. |
| 5,761,367 A | 6/1998 | Matsumoto |
| 5,762,867 A | 6/1998 | D'Silva |
| 5,763,003 A | 6/1998 | Bonicel et al. |
| 5,764,263 A | 6/1998 | Lin |
| 5,840,451 A | 11/1998 | Moore et al. |
| 5,845,034 A | 12/1998 | Petisce |
| D404,045 S | 1/1999 | Mandellos |
| D404,046 S | 1/1999 | Mandellos |
| D404,409 S | 1/1999 | Mandellos |
| 5,857,767 A | 1/1999 | Hochstein |
| 5,885,652 A | 3/1999 | Abbott, III et al. |
| 5,911,023 A | 6/1999 | Risch et al. |
| 5,963,240 A | 10/1999 | Shinohara et al. |
| 5,973,331 A | 10/1999 | Stevens et al. |
| 5,982,968 A | 11/1999 | Stulpin |
| 5,986,682 A | 11/1999 | Itou |
| 5,990,498 A | 11/1999 | Chapnik et al. |
| 5,993,896 A | 11/1999 | Unterberger et al. |
| 6,013,330 A | 1/2000 | Lutz |
| 6,018,605 A | 1/2000 | Mills et al. |
| 6,035,087 A | 3/2000 | Bonicel et al. |
| 6,066,397 A | 5/2000 | Risch et al. |
| 6,075,595 A | 6/2000 | Malinen |
| 6,085,009 A | 7/2000 | Risch et al. |
| 6,092,890 A | 7/2000 | Wen et al. |
| 6,112,037 A | 8/2000 | Nagata et al. |
| 6,118,130 A | 9/2000 | Barry |
| 6,134,363 A | 10/2000 | Hinson et al. |
| 6,145,979 A | 11/2000 | Caiger et al. |
| 6,163,036 A | 12/2000 | Taninaka et al. |
| 6,175,677 B1 | 1/2001 | Yang et al. |
| 6,181,857 B1 | 1/2001 | Emeterio et al. |
| 6,185,394 B1 | 2/2001 | Lee |
| 6,188,086 B1 | 2/2001 | Masuda et al. |
| 6,190,483 B1 | 2/2001 | Yang et al. |
| 6,200,134 B1 | 3/2001 | Kovac et al. |
| 6,210,802 B1 | 4/2001 | Risch et al. |
| 6,215,931 B1 | 4/2001 | Risch et al. |
| 6,287,672 B1 | 9/2001 | Fields et al. |
| 6,314,224 B1 | 11/2001 | Stevens et al. |
| 6,321,012 B1 | 11/2001 | Shen |
| 6,321,014 B1 | 11/2001 | Overton et al. |
| 6,331,111 B1 | 12/2001 | Cao |
| 6,333,509 B1 | 12/2001 | Lumpp |
| 6,334,016 B1 | 12/2001 | Greer, IV |
| 6,338,878 B1 | 1/2002 | Overton et al. |
| 6,345,149 B1 | 2/2002 | Ervin et al. |
| 6,354,700 B1 | 3/2002 | Roth |
| 6,376,568 B1 | 4/2002 | Baudin et al. |
| 6,381,390 B1 | 4/2002 | Hutton et al. |
| 6,425,663 B1 | 7/2002 | Eastland et al. |
| 6,447,112 B1 | 9/2002 | Hu et al. |
| 6,457,823 B1 | 10/2002 | Cleary et al. |
| 6,463,872 B1 | 10/2002 | Thompson |
| 6,493,491 B1 | 12/2002 | Shen et al. |
| 6,498,355 B1 | 12/2002 | Harrah et al. |
| 6,501,084 B1 | 12/2002 | Sakai et al. |
| 6,517,218 B2 | 2/2003 | Hochstein |
| 6,523,948 B2 | 2/2003 | Matsumoto et al. |
| 6,525,752 B2 | 2/2003 | Vackier et al. |
| 6,528,955 B1 | 3/2003 | Powers et al. |
| 6,536,889 B1 | 3/2003 | Biegelsen et al. |
| 6,561,640 B1 | 5/2003 | Young |
| 6,579,495 B1 | 6/2003 | Maiden |
| 6,584,263 B2 | 6/2003 | Fewkes et al. |
| 6,589,716 B2 | 7/2003 | Sweatt et al. |
| 6,603,908 B2 | 8/2003 | Dallas et al. |
| 6,613,170 B2 | 9/2003 | Ohno et al. |
| 6,618,538 B2 | 9/2003 | Nechitailo et al. |
| 6,626,561 B2 | 9/2003 | Carter et al. |
| 6,630,286 B2 | 10/2003 | Kramer |
| 6,658,184 B2 | 12/2003 | Bourget et al. |
| 6,671,421 B1 | 12/2003 | Ogata et al. |
| 6,683,421 B1 | 1/2004 | Kennedy et al. |
| 6,720,566 B2 | 4/2004 | Blandford |
| 6,726,317 B2 | 4/2004 | Codos |
| 6,741,780 B2 | 5/2004 | Vanpoulle et al. |
| 6,749,446 B2 | 6/2004 | Nechitailo |
| 6,755,647 B2 | 6/2004 | Melikechi et al. |
| 6,768,839 B2 | 7/2004 | Blomquist et al. |
| 6,783,810 B2 | 8/2004 | Jin et al. |
| 6,807,906 B1 | 10/2004 | DeMoore et al. |
| 6,835,679 B2 | 12/2004 | Bilanin et al. |
| 6,877,248 B1 | 4/2005 | Cross et al. |
| 6,880,954 B2 | 4/2005 | Ollett et al. |
| 6,885,035 B2 | 4/2005 | Bhat et al. |
| 6,912,347 B2 | 6/2005 | Rossi et al. |
| 6,913,794 B2 | 7/2005 | Hoult et al. |
| 6,922,515 B2 | 7/2005 | Nechitailo et al. |
| 6,929,828 B2 | 8/2005 | Baudin et al. |
| 6,941,049 B2 | 9/2005 | Risch et al. |
| 6,949,591 B1 | 9/2005 | Allard et al. |
| 7,001,644 B2 | 2/2006 | Baudin et al. |
| 7,022,382 B1 | 4/2006 | Khudyakov et al. |
| 7,045,010 B2 | 5/2006 | Sturman, Jr. |
| 7,080,900 B2 | 7/2006 | Takabayashi et al. |
| 7,084,183 B2 | 8/2006 | Fuchs et al. |
| 7,137,696 B2 | 11/2006 | Siegel |
| 7,153,015 B2 | 12/2006 | Brukilacchio |
| 7,162,128 B2 | 1/2007 | Lovie et al. |
| 7,173,266 B2 | 2/2007 | Katsuki |
| 7,175,712 B2 | 2/2007 | Siegel |
| 7,211,299 B2 | 5/2007 | Siegel |

(56) References Cited

U.S. PATENT DOCUMENTS

| | | |
|---|---|---|
| 7,232,850 B2 | 6/2007 | Johnson et al. |
| 7,250,611 B2 | 7/2007 | Aguirre et al. |
| 7,322,122 B2 | 1/2008 | Overton et al. |
| 7,346,244 B2 | 3/2008 | Gowan et al. |
| 7,356,234 B2 | 4/2008 | de Montmorillon et al. |
| 7,399,982 B2 | 7/2008 | Siegel |
| 7,465,909 B2 | 12/2008 | Siegel |
| 7,470,921 B2 | 12/2008 | Custer |
| 7,483,613 B2 | 1/2009 | Bigot-Astruc et al. |
| 7,498,065 B2 | 3/2009 | Siegel |
| 7,515,795 B2 | 4/2009 | Overton et al. |
| 7,555,186 B2 | 6/2009 | Flammer et al. |
| 7,567,739 B2 | 7/2009 | Overton et al. |
| 7,570,852 B2 | 8/2009 | Nothofer et al. |
| 7,587,111 B2 | 9/2009 | de Montmorillon et al. |
| 7,599,589 B2 | 10/2009 | Overton et al. |
| 7,623,747 B2 | 11/2009 | de Montmorillon et al. |
| 7,639,915 B2 | 12/2009 | Parris et al. |
| 7,646,952 B2 | 1/2010 | Parris |
| 7,646,954 B2 | 1/2010 | Tatat |
| 7,671,346 B2 | 3/2010 | Siegel |
| 7,775,690 B2 | 8/2010 | Wakalopulos |
| 7,842,932 B2 | 11/2010 | Knight et al. |
| 7,847,269 B2 | 12/2010 | Cekic et al. |
| 7,889,960 B2 | 2/2011 | de Montmorillon et al. |
| 7,923,706 B2 | 4/2011 | Brassell et al. |
| 7,970,247 B2 | 6/2011 | Barker |
| 7,974,507 B2 | 7/2011 | Lovie et al. |
| 8,314,408 B2 | 11/2012 | Hartsuiker et al. |
| 8,604,448 B2* | 12/2013 | Hartsuiker et al. ......... 250/492.1 |
| 2001/0030866 A1 | 10/2001 | Hochstein |
| 2001/0032985 A1 | 10/2001 | Bhat et al. |
| 2001/0033725 A1 | 10/2001 | Szum et al. |
| 2001/0046652 A1 | 11/2001 | Ostler et al. |
| 2001/0048814 A1 | 12/2001 | Lenmann et al. |
| 2001/0050344 A1 | 12/2001 | Albou |
| 2001/0052920 A1 | 12/2001 | Matsumoto et al. |
| 2002/0015234 A1 | 2/2002 | Suzuki et al. |
| 2002/0016378 A1 | 2/2002 | Jin et al. |
| 2002/0044188 A1 | 4/2002 | Codos |
| 2002/0050575 A1 | 5/2002 | Keogh et al. |
| 2002/0074554 A1 | 6/2002 | Sweatt et al. |
| 2002/0074559 A1 | 6/2002 | Dowling et al. |
| 2002/0149660 A1 | 10/2002 | Cleary et al. |
| 2002/0172913 A1 | 11/2002 | Cao |
| 2002/0175299 A1 | 11/2002 | Kanie et al. |
| 2003/0026919 A1 | 2/2003 | Kojima et al. |
| 2003/0035037 A1 | 2/2003 | Mills et al. |
| 2003/0109599 A1 | 6/2003 | Kamen |
| 2003/0218880 A1 | 11/2003 | Brukilacchio |
| 2003/0222961 A1 | 12/2003 | Nakajima |
| 2004/0011457 A1 | 1/2004 | Kobayashi et al. |
| 2004/0033317 A1 | 2/2004 | Baudin et al. |
| 2004/0036188 A1 | 2/2004 | Arboix et al. |
| 2004/0075065 A1 | 4/2004 | Spivak |
| 2004/0090794 A1 | 5/2004 | Ollett et al. |
| 2004/0114016 A1 | 6/2004 | Yokoyama |
| 2004/0134603 A1 | 7/2004 | Kobayashi et al. |
| 2004/0135159 A1 | 7/2004 | Siegel |
| 2004/0152038 A1 | 8/2004 | Kumagai et al. |
| 2004/0156130 A1 | 8/2004 | Powell et al. |
| 2004/0164325 A1 | 8/2004 | Siegel |
| 2004/0166249 A1 | 8/2004 | Siegel |
| 2004/0189773 A1 | 9/2004 | Masumi |
| 2004/0238111 A1 | 12/2004 | Siegel |
| 2005/0042390 A1 | 2/2005 | Siegel |
| 2005/0051741 A1 | 3/2005 | Hallett et al. |
| 2005/0099478 A1 | 5/2005 | Iwase |
| 2005/0104946 A1 | 5/2005 | Siegel |
| 2005/0115498 A1 | 6/2005 | Ingram et al. |
| 2005/0116176 A1 | 6/2005 | Aguirre et al. |
| 2005/0152146 A1 | 7/2005 | Owen et al. |
| 2005/0222295 A1* | 10/2005 | Siegel ........................ 522/8 |
| 2005/0228062 A1 | 10/2005 | Wolf et al. |
| 2005/0234145 A1 | 10/2005 | Sitzmann et al. |
| 2006/0007290 A1 | 1/2006 | Oshima et al. |
| 2006/0121208 A1 | 6/2006 | Siegel |
| 2006/0127594 A1 | 6/2006 | Siegel |
| 2006/0192829 A1 | 8/2006 | Mills et al. |
| 2006/0204670 A1 | 9/2006 | Siegel |
| 2006/0216193 A1 | 9/2006 | Johnson et al. |
| 2006/0230969 A1 | 10/2006 | Vosahlo |
| 2006/0233501 A1 | 10/2006 | Sampson |
| 2006/0237658 A1 | 10/2006 | Waluszko |
| 2006/0241259 A1 | 10/2006 | Tanabe et al. |
| 2006/0245187 A1 | 11/2006 | Scott et al. |
| 2006/0263921 A1 | 11/2006 | Nakamura et al. |
| 2006/0266955 A1 | 11/2006 | Arvin et al. |
| 2006/0270748 A1 | 11/2006 | Sommerlade et al. |
| 2006/0274421 A1 | 12/2006 | Okamitsu et al. |
| 2007/0241478 A1 | 10/2007 | Buckley |
| 2007/0286963 A1 | 12/2007 | Rocha-Alvarez et al. |
| 2008/0021126 A1 | 1/2008 | Dietliker et al. |
| 2008/0096115 A1 | 4/2008 | Tanabe et al. |
| 2008/0160211 A1 | 7/2008 | Siegel |
| 2008/0226272 A1 | 9/2008 | Kasai et al. |
| 2008/0290301 A1 | 11/2008 | Gardner |
| 2008/0292262 A1 | 11/2008 | Overton et al. |
| 2009/0003785 A1 | 1/2009 | Parris et al. |
| 2009/0032740 A1 | 2/2009 | Smith et al. |
| 2009/0041414 A1 | 2/2009 | Lavenne et al. |
| 2009/0065715 A1 | 3/2009 | Wainright |
| 2009/0127480 A1 | 5/2009 | Biggs et al. |
| 2009/0160923 A1 | 6/2009 | Custer |
| 2009/0175583 A1 | 7/2009 | Overton |
| 2009/0190349 A1 | 7/2009 | Middlemass et al. |
| 2009/0214167 A1 | 8/2009 | Lookadoo et al. |
| 2009/0218960 A1 | 9/2009 | Lyons et al. |
| 2009/0252469 A1 | 10/2009 | Sillard et al. |
| 2009/0279833 A1 | 11/2009 | Overton et al. |
| 2009/0279835 A1 | 11/2009 | de Montmorillon et al. |
| 2009/0279836 A1 | 11/2009 | de Montmorillon et al. |
| 2009/0297107 A1 | 12/2009 | Tatat |
| 2009/0321666 A1 | 12/2009 | Hilgers |
| 2010/0021170 A1 | 1/2010 | Lumineau et al. |
| 2010/0028020 A1 | 2/2010 | Gholami et al. |
| 2010/0067855 A1 | 3/2010 | Barker |
| 2010/0067857 A1 | 3/2010 | Lovie et al. |
| 2010/0092135 A1 | 4/2010 | Barker et al. |
| 2010/0092138 A1 | 4/2010 | Overton |
| 2010/0092139 A1 | 4/2010 | Overton |
| 2010/0092140 A1 | 4/2010 | Overton |
| 2010/0096564 A1 | 4/2010 | Yang et al. |
| 2010/0118388 A1 | 5/2010 | Pastouret et al. |
| 2010/0119202 A1 | 5/2010 | Overton |
| 2010/0135623 A1 | 6/2010 | Overton |
| 2010/0135624 A1 | 6/2010 | Overton et al. |
| 2010/0135625 A1 | 6/2010 | Overton |
| 2010/0135627 A1 | 6/2010 | Pastouret et al. |
| 2010/0142033 A1 | 6/2010 | Regnier et al. |
| 2010/0142969 A1 | 6/2010 | Gholami et al. |
| 2010/0150505 A1 | 6/2010 | Testu et al. |
| 2010/0154479 A1 | 6/2010 | Milicevic et al. |
| 2010/0166375 A1 | 7/2010 | Parris |
| 2010/0171945 A1 | 7/2010 | Gholami et al. |
| 2010/0183821 A1 | 7/2010 | Hartsuiker et al. |
| 2010/0189397 A1 | 7/2010 | Richard et al. |
| 2010/0189399 A1 | 7/2010 | Sillard et al. |
| 2010/0189400 A1 | 7/2010 | Sillard et al. |
| 2010/0202741 A1 | 8/2010 | Ryan et al. |
| 2010/0214649 A1 | 8/2010 | Burov et al. |
| 2010/0215328 A1 | 8/2010 | Tatat et al. |
| 2010/0223803 A1 | 9/2010 | Karlicek et al. |
| 2010/0242299 A1 | 9/2010 | Siegel |
| 2010/0254653 A1 | 10/2010 | Molin et al. |
| 2010/0310218 A1 | 12/2010 | Molin et al. |
| 2011/0026889 A1 | 2/2011 | Risch et al. |
| 2011/0058781 A1 | 3/2011 | Molin et al. |
| 2011/0064367 A1 | 3/2011 | Molin et al. |
| 2011/0064371 A1 | 3/2011 | Leatherman et al. |
| 2011/0069724 A1 | 3/2011 | Richard et al. |
| 2011/0069932 A1 | 3/2011 | Overton et al. |
| 2011/0091171 A1 | 4/2011 | Tatat et al. |
| 2011/0116160 A1 | 5/2011 | Boivin et al. |

(56) References Cited

U.S. PATENT DOCUMENTS

| | | |
|---|---|---|
| 2011/0123161 A1 | 5/2011 | Molin et al. |
| 2011/0123162 A1 | 5/2011 | Molin et al. |
| 2011/0135262 A1 | 6/2011 | Molin et al. |
| 2011/0135263 A1 | 6/2011 | Molin et al. |
| 2011/0176782 A1 | 7/2011 | Parris |
| 2011/0188823 A1 | 8/2011 | Sillard et al. |
| 2011/0188826 A1 | 8/2011 | Sillard et al. |
| 2011/0217012 A1 | 9/2011 | Bigot-Astruc et al. |
| 2011/0229101 A1 | 9/2011 | de Montmorillon et al. |
| 2011/0268398 A1 | 11/2011 | Quinn et al. |
| 2011/0268400 A1 | 11/2011 | Lovie et al. |
| 2011/0287195 A1 | 11/2011 | Molin |
| 2012/0009358 A1 | 1/2012 | Gharbi et al. |
| 2012/0014652 A1 | 1/2012 | Parris |
| 2012/0040105 A1 | 2/2012 | Overton |
| 2012/0051703 A1 | 3/2012 | Bigot-Astruc et al. |
| 2013/0052364 A1 | 2/2013 | Hartsuiker et al. |
| 2013/0068969 A1 | 3/2013 | Childers |

FOREIGN PATENT DOCUMENTS

| | | |
|---|---|---|
| DE | 4226344 C2 | 7/2002 |
| DE | 102004008812 A | 9/2005 |
| EP | 0228896 A1 | 7/1987 |
| EP | 0854022 A1 | 7/1998 |
| EP | 1139439 A1 | 10/2001 |
| EP | 1138642 B1 | 7/2004 |
| EP | 1508157 A2 | 2/2005 |
| EP | 1250297 B1 | 10/2005 |
| EP | 1651916 A2 | 5/2006 |
| EP | 1701984 A1 | 9/2006 |
| EP | 1704170 A1 | 9/2006 |
| EP | 1764220 A1 | 3/2007 |
| EP | 1765878 A1 | 3/2007 |
| EP | 1599340 B1 | 9/2007 |
| EP | 1861234 A2 | 12/2007 |
| EP | 1871608 A2 | 1/2008 |
| EP | 1921478 A1 | 5/2008 |
| EP | 2085801 A1 | 8/2009 |
| EP | 2388239 A1 | 11/2011 |
| EP | 2418183 A2 | 2/2012 |
| GB | 2166975 A | 5/1986 |
| GB | 2350321 A | 11/2000 |
| GB | 2390332 A | 1/2004 |
| GB | 2396331 A | 6/2004 |
| JP | 60-126830 A | 7/1985 |
| JP | 61-010440 A | 1/1986 |
| JP | 62-026876 A | 2/1987 |
| JP | 63-182528 A | 7/1988 |
| JP | 1-107865 A | 4/1989 |
| JP | 1-124324 A | 5/1989 |
| JP | 5-213636 A | 8/1993 |
| JP | 5-323462 A | 12/1993 |
| JP | 2000-268416 B | 9/2000 |
| JP | 2001-209980 B | 8/2001 |
| JP | 2002-248803 A | 9/2002 |
| JP | 2003-029099 A | 1/2003 |
| JP | 2003-034557 A | 2/2003 |
| JP | 2003-034558 A | 2/2003 |
| JP | 2003089555 A | 3/2003 |
| JP | 2005-129662 B | 5/2005 |
| JP | 2010-117526 A | 5/2010 |
| JP | 2010-117527 A | 5/2010 |
| WO | 01/11426 A1 | 2/2001 |
| WO | 02/093265 A1 | 11/2002 |
| WO | 2004/002746 A1 | 1/2004 |
| WO | 2004/011848 A2 | 2/2004 |
| WO | 2005/082548 A2 | 9/2005 |
| WO | 2006/096061 A1 | 9/2006 |
| WO | 2006/101519 A3 | 9/2006 |
| WO | 2006/101526 A3 | 9/2006 |
| WO | 2008/040650 A2 | 4/2008 |
| WO | 2009/062131 A1 | 5/2009 |
| WO | 2010/077132 A1 | 7/2010 |

OTHER PUBLICATIONS

Davidson, "Fundamental of Light-Emitting Diodes" Zeiss Microscopy (2008), online at http://zeiss-campus.magnet.fsu.edu/print/lightsources/leds-print.html, pp. 1-12.

Moreno et al., "Modeling the radiation pattern of LEDs", Optics Express, vol. 16, No. 3, (2008), pp. 1808-1819.

U.S. Appl. No. 61/112,595 for a Microbend Resistant Optical Fiber, filed Nov. 7, 2008, (Overton), pp. 1-321.

Dake et al., "LED Curing Versus Conventional UV Curing Systems: Property Comparisons of Acrylates and Epoxies," Radtech Report 51 (2004) DSM Desotech, USA, pp. 1-5.

International Search Report and Written Opinion in counterpart International Application No. PCT/NL2009/000273, dated Apr. 14, 2010, pp. 1-11.

U.S. Appl. No. 61/141,698 for a UVLED Apparatus for Curing Glass-Fiber Coatings, filed Dec. 31, 2008, (Hartsuiker et al.), pp. 1-35.

U.S. Appl. No. 60/986,737 for a Microbend Resistant Optical Fiber, filed Nov. 9, 2007, (Overton), pp. 1-65.

U.S. Appl. No. 61/041,484 for a Microbend Resistant Optical Fiber, filed Apr. 1, 2008, (Overton), pp. 1-80.

U.S. Appl. No. 61/351,151 for a Curing Apparatus Employing Angled UVLEDs, filed Jun. 3, 2010, (Molin), pp. 1-61.

U.S. Appl. No. 61/351,205 for a Curing Apparatus Having UV Sources That Emit Differing Ranges of UV Radiation, filed Jun. 3, 2010, (Gharbi et al.), pp. 1-65.

Dutch Search Report and Written Opinion in counterpart Dutch Application No. 1036470 dated Sep. 10, 2009, pp. 1-9.

International Preliminary Report on Patentability in counterpart International Application No. PCT/NL2009/000273 mailed Jul. 14, 2011, pp. 1-10.

Overton, U.S. Appl. No. 13/206,601, "Method and Apparatus Providing Increased UVLED Intensity and Uniform Curing of Optical-Fiber Coatings" Aug. 10, 2011, pp. 1-72.

Gharbi et al., U.S. Appl. No. 13/152,651, "Curing Method Employing UV Sources That Emit Differing Ranges of UV Radiation" Jun. 3, 2011, pp. 1-64.

CIBA, "Photoinitiators for UV Curing," Key Products Selection Guide 2003, Switzerland, pp. 1-8.

CIBA. "Photoinitiators for UV Curing," Formulators' Guide for Coatings, Additives, Switzerland, downloaded from www.mufon.com.tw/Ciba/ciba_guid/photo_uv_2.pdf on May 30, 2012, pp. 1-14.

* cited by examiner

METHOD FOR CURING GLASS-FIBER COATINGS

CROSS-REFERENCE TO PRIORITY APPLICATIONS

This application is a continuation of commonly assigned U.S. application Ser. No. 13/663,662 for a *UVLED Apparatus for Curing Glass-Fiber Coatings*, (filed Oct. 30, 2012, and published Feb. 28, 2013, as Publication No. 2013/0052364 A1), now U.S. Pat. No. 8,604,448, which itself is a division of commonly assigned U.S. application Ser. No. 12/649,758 for a *UVLED Apparatus for Curing Glass-Fiber Coatings*, (filed Dec. 30, 2009, and published Jul. 22, 2010, as Publication No. 2010/0183821 A1), now U.S. Pat. No. 8,314,408, which itself claims the benefit of commonly assigned U.S. Patent Application No. 61/141,698 for a *UVLED Apparatus for Curing Glass-Fiber Coatings* (filed Dec. 31, 2008). Each of the foregoing patent applications and patent application publications is hereby incorporated by reference in its entirety.

FIELD OF THE INVENTION

The present invention embraces an apparatus and a method for curing coatings on drawn glass fibers.

BACKGROUND

Glass fibers are typically protected from external forces with one or more coating layers. Typically, two or more layers of coatings are applied during the optical-fiber drawing process (i.e., whereby a glass fiber is drawn from an optical preform in a drawing tower). A softer inner coating layer typically helps to protect the glass fiber from microbending. A harder outer coating layer typically is used to provide additional protection and to facilitate handling of the glass fiber. The coating layers may be cured, for example, using heat or ultraviolet (UV) light.

UV curing requires that the coated glass fiber be exposed to high intensity UV radiation. Curing time can be reduced by exposing the coating to higher intensity UV radiation. Reducing curing time is particularly desirable to permit an increase in fiber drawing line speeds and thus optical-fiber production rates.

Mercury lamps (e.g., high pressure mercury lamps or mercury xenon lamps) are commonly used to generate the UV radiation needed for UV curing. One downside of using mercury lamps is that mercury lamps require a significant amount of power to generate sufficiently intense UV radiation. For example, UV lamps used to cure a single coated fiber (i.e., one polymeric coating) may require a collective power consumption of 50 kilowatts.

Another shortcoming of mercury lamps is that much of the energy used for powering mercury lamps is emitted not as UV radiation, but rather as heat. Accordingly, mercury lamps must be cooled (e.g., using a heat exchanger) to prevent overheating. In addition, the undesirable heat generated by the mercury lamps may slow the rate at which the optical fiber coatings cure.

Furthermore, mercury lamps generate a wide spectrum of electromagnetic radiation, such as having wavelengths of less than 200 nanometers and greater than 700 nanometers (i.e., infrared light). Typically, UV radiation having wavelengths of between about 300 nanometers and 400 nanometers is useful for curing UV coatings. Thus, much of the electromagnetic radiation generated by mercury bulbs is wasted (e.g., 90 percent or more). Additionally, glass fibers possess an exemplary diameter of about 125 microns, which, of course, is much smaller than the mercury bulbs. Consequently, most of the UV radiation emitted by the mercury lamps does not reach the glass fiber's uncured coating (i.e., the energy is wasted).

It may thus be advantageous to employ UVLEDs, an alternative to conventional mercury lamps, to cure glass-fiber coatings. UVLEDs typically require significantly less energy and correspondingly generate much less heat energy than conventional UV lamps.

For example, U.S. Pat. No. 7,022,382 (Khudyakov et al.), which is hereby incorporated by reference in its entirety, discloses the use of UV lasers (e.g., continuous or pulsed lasers) for curing optical fiber coatings.

U.S. Patent Application Publication No. 2003/0026919 (Kojima et al.), which is hereby incorporated by reference in its entirety, discloses the use of ultraviolet light emitting diodes (UVLEDs) for curing optical fiber coatings. The disclosed optical fiber resin coating apparatus includes a mold assembly in which a UV curable resin is coated onto an optical fiber. Also at the mold assembly, the coated optical fiber is exposed to UV radiation from a number of UVLEDs to cure the UV coating. A control circuit may be used to control the UV radiation output from the UVLED array. For example, the control circuit may reduce the current to one or more UVLEDs to reduce the intensity of emitted UV radiation. The control circuit may also be used to vary the intensity of the UV radiation as the optical fiber progresses through the mold assembly.

Even so, UVLEDs, though more efficient than mercury lamps, still waste a significant amount of energy in curing glass-fiber coatings. In particular, much of the emitted UV radiation is not used to cure the glass-fiber coatings.

Therefore, a need exists for a UVLED apparatus that, as compared with a conventional mercury-lamp device, not only consumes less power and generates less unwanted heat, but also is capable of curing glass-fiber coatings with improved curing efficiency.

SUMMARY

Accordingly, the invention embraces a UVLED apparatus and associated method for curing in situ optical-fiber coating. The apparatus and method employ one or more UVLEDs that emit electromagnetic radiation into a curing space. An incompletely cured, coated glass fiber passes through the curing space, thereby absorbing electromagnetic radiation to effect curing of the optical-fiber coating.

An exemplary UVLED apparatus includes one or more UVLED-mirror pairs. Each UVLED-mirror pair includes one or more UVLEDs capable of emitting electromagnetic radiation and one or more mirrors (or other reflective surfaces) that are capable of reflecting electromagnetic radiation. The UVLED(s) and corresponding mirror(s) are positioned apart from one another so as to define a curing space. As noted, this curing space permits the passage of a coated glass fiber between the UVLED(s) and the mirror(s). Moreover, the mirror(s) are typically positioned opposite corresponding UVLED(s) to efficiently reflect the electromagnetic radiation emitted from the UVLED(s) (and not already absorbed by the glass-fiber coating) into the curing space.

In another aspect, the present invention embraces a method for curing a coating on a glass fiber. UV radiation is emitted from one or more sources of electromagnetic radiation toward a curing space. A portion of the emitted UV radiation is transmitted entirely through the curing space. At least some of the UV radiation transmitted entirely through the curing space is reflected toward the curing space (e.g., with a mirror).

A glass fiber having an incompletely cured coating is passed through the curing space to effect the absorption of both emitted and reflected UV radiation, thereby curing the coated glass fiber.

The foregoing illustrative summary, as well as other exemplary objectives and/or advantages of the invention, and the manner in which the same are accomplished, are further explained within the following detailed description and its accompanying drawings.

DETAILED DESCRIPTION

In one aspect, the present invention embraces an apparatus for curing glass-fiber coatings.

The apparatus employs one or more UVLEDs that are configured to emit electromagnetic radiation toward a drawn glass fiber to cure its coating(s), typically polymeric coatings. In this regard, a plurality of UV lamps may be positioned in various configurations, such as an apparatus 10 containing opposing UVLEDs 11 schematically depicted in FIG. 1 and an apparatus 20 containing staggered UVLEDs 11 depicted in FIG. 2. The UVLEDs 11 define a curing space 15 having a central axis 14 along which an optical fiber (i.e., a glass fiber having one or more coating layers) may pass during the curing process. A heat sink 12 may be positioned adjacent to each UVLED 11 to dissipate generated heat energy. A mounting plate 13 provides structural support for the UVLEDs 11.

In one exemplary embodiment, the apparatus for curing glass-fiber coatings includes at least a UVLED-mirror pair, which includes (i) an ultraviolet light emitting diode (UVLED) and (ii) a mirror (e.g., a concave mirror) that is positioned to reflect and focus the UV radiation emitted by the UVLED.

Figure 3:
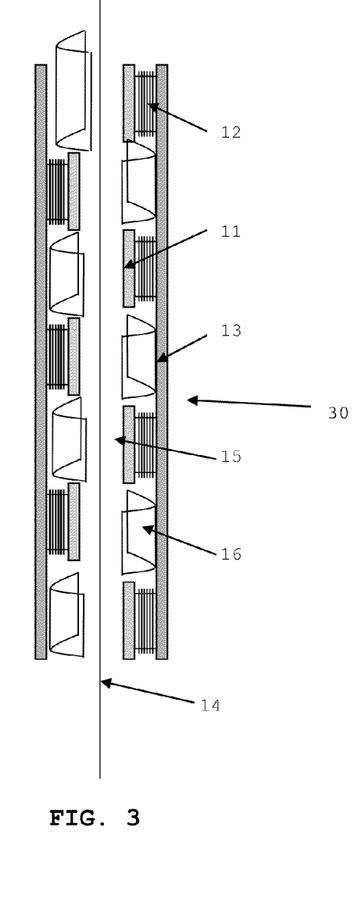
FIG. 3 schematically depicts a staggered UVLED-mirror configuration for the high-efficiency curing of a coating upon a glass fiber.

FIG. 3 schematically depicts an apparatus 30 containing a plurality of UVLED-mirror pairs. As depicted in FIG. 3, the UVLEDs 11 and corresponding mirrors 16 define a space through which the coated glass fiber can pass (i.e., a curing space 15). This curing space 15 further defines a central axis 14, typically the axis along which a drawn glass fiber passes during the curing process (i.e., the glass fiber's curing axis). Although the central axis 14 is typically vertical, non-vertical (e.g., horizontal) arrangements of the central axis 14 may also be used. Moreover, although the central axis may be centrally positioned in the curing space, a central axis that is not centrally positioned within the curing space is within the scope of the present invention.

Each UVLED 11 may be positioned such that it emits UV radiation toward the central axis 14. In this regard, those of ordinary skill will appreciate that the power per unit area (i.e., the radiant flux) emitted by a UVLED decreases exponentially as the distance of the UVLED from the optical fiber increases. Accordingly, each UVLED may be positioned at a distance of between about 1 millimeter and 100 millimeters (e.g., typically between about 5 millimeters and 20 millimeters) from the optical fiber to be cured (e.g., from the central axis).

Typically, a UVLED and its corresponding mirror are positioned so that a substantial portion of the UV radiation incident to the optical fiber is substantially perpendicular to the optical fiber (i.e., incident at about a 90 degree angle).

Figure 5:
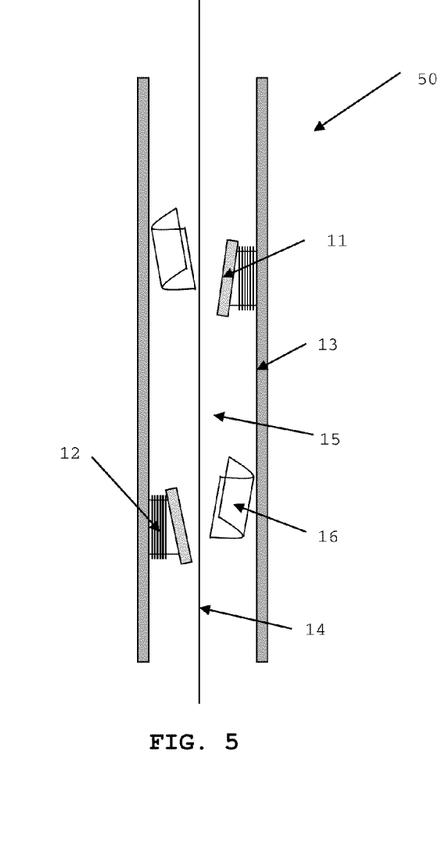
FIG. 5 schematically depicts a UVLED-mirror configuration having UVLEDs and mirrors positioned at an angle.

Alternatively, the UVLED and/or its corresponding mirror may be positioned at an angle so that most of the UV radiation incident to the optical fiber is incident at an angle other than 90 degrees. FIG. 5 schematically depicts an apparatus 50 containing UVLEDs 11 and mirrors 16 positioned at an angle (i.e., an angle other than 90 degrees relative to the optical fiber and the central axis 14).

It may be desirable for the power of the UV radiation incident to the optical fiber to vary as the optical fiber progresses through the apparatus. Varying the power of the UV radiation may aid in the curing of the glass-fiber coating. Depending on the curing properties of a particular coating, it may be desirable to initially expose the optical fiber to high intensity UV radiation. Alternatively, it may be desirable to initially expose the optical fiber to lower intensity UV radiation (e.g., between about 10 percent and 50 percent of the maximum exposure intensity) before exposing the optical fiber to high intensity UV radiation (e.g., the maximum intensity to which the optical fiber is exposed). In this regard, initially exposing the optical fiber to lower intensity UV radiation may be useful in controlling the generation of free radicals in an uncured coating. Those of ordinary skill in the art will appreciate that if too many free radicals are present, many of the free radicals may recombine rather than encourage the polymerization of the glass-fiber coating—an undesirable effect.

Varying the intensity of the UV radiation may, for example, be achieved by positioning the UVLED at an angle. As noted, the intensity of the UV radiation incident to a portion of the optical fiber may vary depending upon the distance from that portion to the UVLED. Alternatively, in an apparatus containing a plurality of UVLEDs the intensity of the UV radiation output from the UVLEDs may vary.

As noted, each UVLED may be positioned such that it emits UV radiation toward the central axis. That said, it will be appreciated by those of ordinary skill in the art that a UVLED does not emit UV radiation only toward a point or line, but rather emits UV radiation in many directions. Thus, most of the UV radiation emitted by a UVLED will not strike the glass-fiber coating to effect curing. However, in curing an optical fiber coating, it is desirable that as much UV radiation as possible strikes the optical fiber (i.e., a coated glass fiber). In this regard, it will be further appreciated by those of ordinary skill in the art that curing occurs when UV radiation is absorbed by photoinitiators in the glass-fiber coating.

Figure 6:
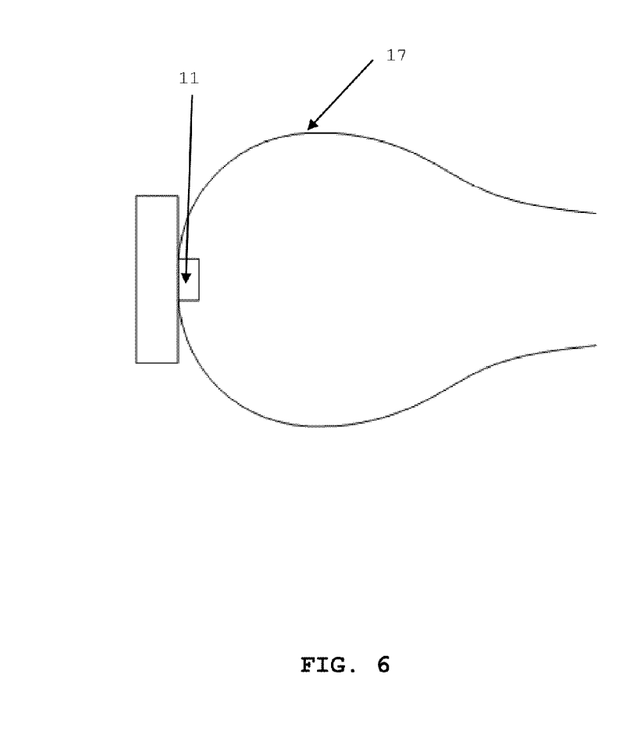
FIG. 6 schematically depicts a UVLED having an attached reflector for focusing emitted UV radiation.

Thus, a UVLED may have one or more associated reflectors that focus emitted UV radiation toward the central axis. For example, FIG. 6 depicts a cross-sectional view of a UVLED 11 having an attached reflector 17. The reflector 17 may, for example and as depicted in FIG. 6, have the shape of a rotated teardrop curve. By having a teardrop shape, the reflector focuses UV radiation having various angles of emittance toward the central axis. That said, the present invention embraces UVLEDs with associated reflectors of various shapes (e.g., a spherical, elliptical, cylindrical or parabolic mirror).

A UVLED may have one or more lenses attached for focusing UV radiation emitted by the UVLED toward the central axis. Typically, a lens for focusing electromagnetic radiation is convex (e.g., biconvex or plano-convex). In an alternative embodiment, a Fresnel lens may be employed. Moreover, the lens may be selected such that the lens has a focal point at the glass fiber's curing axis (e.g., the central axis).

One or more mirrors may be positioned opposite a UVLED (i.e., on the opposite side of the central axis) so as to reflect the UV radiation emitted by the UVLED in the general direction of the central axis. In other words, a UVLED emits UV radiation toward the curing space and the central axis, and its corresponding mirror(s) reflect emitted UV radiation not initially absorbed by optical fiber coatings back toward the central axis (e.g., the glass fiber's curing axis). In this respect, FIG. 3 depicts UVLEDs 11 having a mirror 16 positioned opposite the central axis 14. Typically a mirror will be larger than its corresponding UVLED. For example, a mirror may have a height of between about one inch and 1.5 inches; however, other mirror sizes are within the scope of the present invention. The mirror may be formed from a suitable reflective material. For example, the mirror may be formed from polished aluminum, polished stainless steel, or metalized glass (e.g., silvered quartz).

The mirror may have a concave shape (i.e., the mirror is curved inwards toward the curing space) so that the mirror focuses UV radiation emitted by the UVLED toward the central axis. By way of example, a concave mirror may have, inter alia, a cylindrical, elliptical, spherical, or parabolic shape (e.g., a paraboloid or a parabolic cylinder). A concave mirror can focus otherwise lost UV radiation (e.g., UV radiation not initially incident to an optical fiber to be cured) onto an optical fiber for curing, thus limiting the amount of wasted energy.

A UVLED-mirror pair as used herein is not limited to a single UVLED paired with a single mirror in a one-to-one relationship. A UVLED-mirror pair may include a plurality of UVLEDs. Alternatively, a UVLED-mirror pair may include a plurality of mirrors.

UVLEDs are capable of emitting wavelengths within a much smaller spectrum than conventional UV lamps. This promotes the use of more of the emitted electromagnetic radiation for curing.

In this regard, a UVLED for use in the present invention may be any suitable LED that emits electromagnetic radiation having wavelengths of between about 200 nanometers and 600 nanometers. By way of example, the UVLED may emit electromagnetic radiation having wavelengths of between about 200 nanometers and 450 nanometers (e.g., between about 250 nanometers and 400 nanometers). In a particular exemplary embodiment, the UVLED may emit electromagnetic radiation having wavelengths of between about 300 nanometers and 400 nanometers. In another particular exemplary embodiment, the UVLED may emit electromagnetic radiation having wavelengths of between about 350 nanometers and 425 nanometers.

As noted, a UVLED typically emits a narrow band of electromagnetic radiation. For example, the UVLED may substantially emit electromagnetic radiation having wavelengths that vary by no more than about 30 nanometers, typically no more than about 20 nanometers (e.g., a UVLED emitting a narrow band of UV radiation mostly between about 375 nanometers and 395 nanometers). It has been observed that a UVLED emitting a narrow band of UV radiation mostly between about 395 nanometers and 415 nanometers is more efficient than other narrow bands of UV radiation. Moreover, it has been observed that UVLEDs emitting UV radiation slightly above the wavelength at which a glass-fiber coating has maximum absorption (e.g., about 360 nanometers) promote more efficient polymerization than do UVLEDs emitting UV radiation at the wavelength at which the glass-fiber coating has maximum absorption.

In this regard, although an exemplary UVLED emits substantially all of its electromagnetic radiation within a defined range (e.g., between 350 nanometers and 450 nanometers, such as between 370 nanometers and 400 nanometers), the UVLED may emit small amounts of electromagnetic radiation outside the defined range. In this regard, 80 percent or more (e.g., at least about 90 percent) of the output (i.e., emitted electromagnetic radiation) of an exemplary UVLED is typically within a defined range (e.g., between about 375 nanometers and 425 nanometers).

UVLEDs are typically much smaller than conventional UV lamps (e.g., mercury bulbs). By way of example, the UVLED may be a 0.25-inch square UVLED. The UVLED may be affixed to a platform (e.g., a 1-inch square or larger mounting plate). Of course, other UVLED shapes and sizes are within the scope of the present invention. By way of example, a 3-millimeter square UVLED may be employed.

Each UVLED may have a power output of as much as 32 watts (e.g., a UVLED having a power input of about 160 watts and a power output of about 32 watts). That said, UVLEDs having outputs greater than 32 watts (e.g., 64 watts) may be employed as such technology becomes available. Using UVLEDs with higher power output may be useful for increasing the rate at which optical fiber coatings cure, thus promoting increased production line speeds.

Relative to other UV radiation sources, UVLED devices typically generate a smaller amount of heat energy. That said, to dissipate the heat energy created by a UVLED, a heat sink may be located behind the UVLED (e.g., opposite the portion of the UVLED that emits UV radiation). The heat sink may be one-inch square, although other heat sink shapes and sizes are within the scope of the present invention.

The heat sink may be formed of a material suitable for conducting heat (e.g., brass, aluminum, or copper). The heat sink may include a heat exchanger that employs a liquid coolant (e.g., chilled water), which circulates within the heat exchanger to draw heat from the UVLED.

Removing heat generated by the UVLED is important for several reasons. First, excess heat may slow the rate at which optical-fiber coatings cure. Furthermore, excess heat can cause the temperature of the UVLED to rise, which can reduce UV-radiation output. Indeed, continuous high-temperature exposure can permanently reduce the UVLED's radiation output. With adequate heat removal, however, the UVLED may have a useful life of 50,000 hours or more.

In another exemplary embodiment, the apparatus for curing glass-fiber coatings includes two or more UVLEDs.

Figure 1:
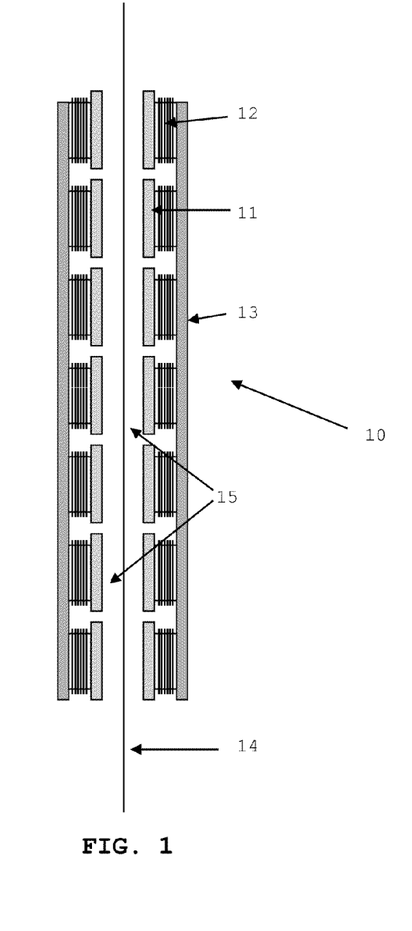
FIG. 1 schematically depicts a UVLED configuration for the curing of a coating upon a glass fiber.
Figure 2:
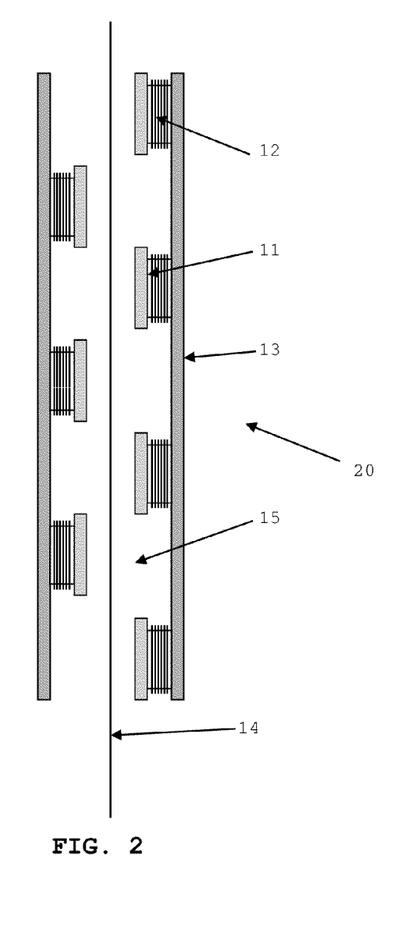
FIG. 2 schematically depicts an alternative staggered UVLED configuration for the curing of a coating upon a glass fiber.

For instance, the UVLEDs may be arranged in an array (e.g., a planar or non-planar array, such as a three-dimensional array). With respect to a three-dimensional array, two or more UVLEDs may be configured in two or more distinct planes that are substantially perpendicular to the central axis. As depicted in FIGS. 1 and 2, the UVLEDs 11, which emit UV radiation toward the curing space 15, are typically arranged approximately equidistant from the central axis 14.

The UVLEDs, for instance, may be arranged to define one or more helixes (i.e., a helical array of UVLEDs). In an array containing more than one helix, the helixes may have the same chirality (i.e., asymmetric handedness). Alternatively, at least one helix may have the opposite chirality (e.g., one helix may be right-handed and a second helix may be left-handed).

The three-dimensional array of UVLEDs may define a curing space that is suitable for the passage of a coated glass fiber for curing. As before, the curing space defines a central axis (e.g., the axis along which a drawn glass fiber passes during the curing process).

Figure 4:
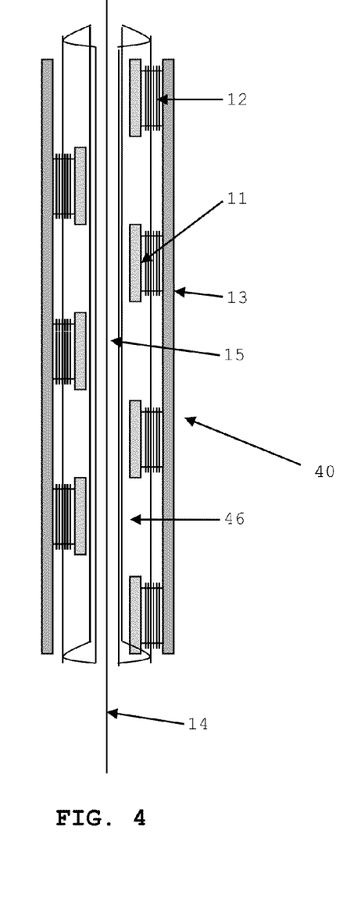
FIG. 4 schematically depicts an alternative staggered UVLED-mirror configuration for the high-efficiency curing of a coating upon a glass fiber.

The apparatus employing a three-dimensional array of UVLEDs for curing glass-fiber coatings may also include one or more mirrors for reflecting UV radiation into the curing space. For example, the apparatus may include a plurality of the foregoing UVLED-mirror pairs. By way of further example and as depicted in FIG. 4, a plurality of UVLEDs 11 may be embedded in a mirror 46 (e.g., a mirror in the shape of a circular, elliptical, or parabolic cylinder), the interior of which defines the curing space 15.

It will be appreciated by those of skill in the art that the position of the UVLEDs in a three-dimensional array may be defined by the cylindrical coordinate system (i.e., $r$, $\theta$, $z$). Using the cylindrical coordinate system and as described herein, the central axis of the curing space defines a z-axis. Furthermore, as herein described and as will be understood by those of ordinary skill in the art, the variable $r$ is the perpendicular distance of a point to the z-axis (i.e., the central axis of the curing space). The variable $\theta$ describes the angle in a plane that is perpendicular to the z-axis. In other words and by reference to a Cartesian coordinate system (i.e., defining an x-axis, a y-axis, and a z-axis), the variable $\theta$ describes the angle between a reference axis (e.g., the x-axis) and the orthogonal projection of a point onto the x-y plane. Finally, the z variable describes the height or position of a reference point along the z-axis.

Thus, a point is defined by its cylindrical coordinates ($r$, $\theta$, $z$). For UVLEDs employed in exemplary configurations, the variable $r$ is usually constant. Stated otherwise, the UVLEDs may be positioned approximately equidistant from the central axis (i.e., the z axis). Accordingly, to the extent the variable $r$ is largely fixed, the position of the UVLEDs can be described by the z and $\theta$ coordinates.

By way of example, a helical UVLED array may have a first UVLED at the position (1, 0, 0), where $r$ is fixed at a constant distance (i.e., represented here as a unitless 1). Additional UVLEDs may be positioned, for example, every 90° (i.e., $\pi/2$) with a $\Delta z$ of 1 (i.e., a positional step change represented here as a unitless 1). Thus, a second UVLED would have the coordinates (1, $\pi/2$, 1), a third UVLED would have the coordinates (1, $\pi$, 2), and a fourth UVLED would have the coordinates (1, $3\pi/2$, 3), thereby defining a helical configuration.

Those having ordinary skill in the art will appreciate that, as used in the foregoing example, the respective distances $r$ and $z$ need not be equivalent. Moreover, those having ordinary skill in the art will further appreciate that several UVLEDs in an array as herein disclosed need not be offset by 90° (e.g., $\pi/2$, $\pi$, $3\pi/2$, etc.). For example, the UVLEDs may be offset by 60° (e.g., $\pi/3$, $2\pi/3$, $\pi$, etc.) or by 120° (e.g., $2\pi/3$, $4\pi/3$, $2\pi$, etc.). Indeed, the UVLEDs in an array as discussed herein need not follow a regularized helical rotation.

It will be further appreciated by those of ordinary skill in the art that UVLEDs may absorb incident electromagnetic radiation, which might diminish the quantity of reflected UV radiation available for absorption by the glass-fiber coating. See FIG. 1. Therefore, in an apparatus for curing glass-fiber coatings having a plurality of UVLEDs, it may be desirable to position the UVLEDs in a way that reduces UV radiation incident to the UVLEDs. See FIGS. 2, 3, and 4.

In an exemplary embodiment described using the cylindrical coordinate system, UVLEDs with a $\Delta\theta$ of $\pi$ (i.e., UVLEDs positioned on opposite sides of a UVLED array) may be positioned so that they have a $\Delta z$ that is at least the height of the UVLED. Thus, if each UVLED has a height of 0.5 inch, a UVLED with a $\Delta\theta$ of $\pi$ should have a $\Delta z$ of at least 0.5 inch. It is thought that this would reduce the absorption by one UVLED of UV radiation emitted by another UVLED, thereby increasing the availability of UV radiation for reflection by one or more mirrors and absorption by the glass-fiber coating.

Alternatively (or in accordance with the foregoing discussion), the UVLEDs may employ a reflective surface (e.g., a surface coating) that promotes reflection of incident electromagnetic radiation yet permits the transmission of emitted electromagnetic radiation.

In view of the foregoing, yet another exemplary embodiment employs a plurality of UVLED-mirror pairs that are arranged in a three dimensional configuration. In particular, the plurality of UVLED-mirror pairs share a common curing space defining a common central axis. In an exemplary configuration, the UVLED-mirror pairs may be helically arranged (e.g., configured in a 60°, 90°, or 120° helical array).

In yet another exemplary embodiment, the apparatus for curing glass-fiber coatings includes one or more UVLEDs positioned within a cylindrical cavity (or a substantially cylindrical cavity) having a reflective inner surface (e.g., made from stainless steel or silvered quartz, or otherwise including a reflective inner surface).

The interior of the cylindrical cavity defines the curing space. As before, the curing space defines a curing axis (e.g., a central axis) along which a drawn glass fiber passes during the curing process. Moreover, one or more UVLEDs may be positioned within the cylindrical cavity such that they emit UV radiation in the direction of the curing axis.

Figure 7:
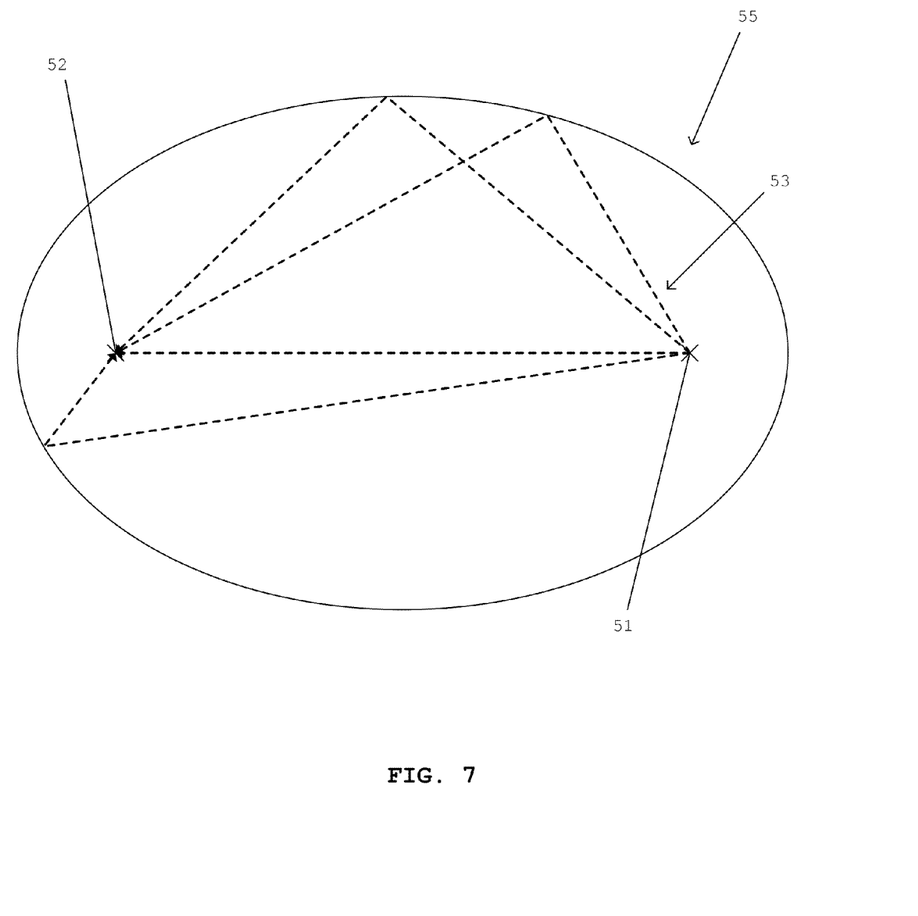
FIG. 7 depicts a cross-sectional view of an elliptic cylinder having a reflective inner surface.

In a typical embodiment, the cylindrical cavity has a non-circular elliptical cross-section. In other words, the cylindrical cavity typically has the shape of an elliptic cylinder. For an elliptic cylinder the curing axis may correspond with one of the two line foci defined by the elliptic cylinder. In addition, each UVLED may be positioned along the other line focus such that they emit UV radiation in the general direction of the curing axis. This arrangement is useful for improving curing efficiency, because any electromagnetic radiation that is emitted from one line focus (regardless of direction) will be directed toward the other line focus after being reflected at the inner surface of the cylinder. This principle is illustrated in FIG. 7, which depicts a cross-section of a reflective elliptic cylinder 55 having a first line focus 51 and a second line focus 52. As depicted in FIG. 7, each UV ray 53 emitted from the first line focus 51 will intersect the second line focus 52.

That said, the UV radiation emitted from a UVLED is not emitted from a single point. Therefore and because of the small size of a coated glass fiber, it is desirable to use small UVLEDs (e.g., a 3-millimeter square UVLED or a 1-millimeter square UVLED), because a greater percentage of emitted and reflected light from a small UVLED will be incident to the coated glass fiber.

Figure 8:
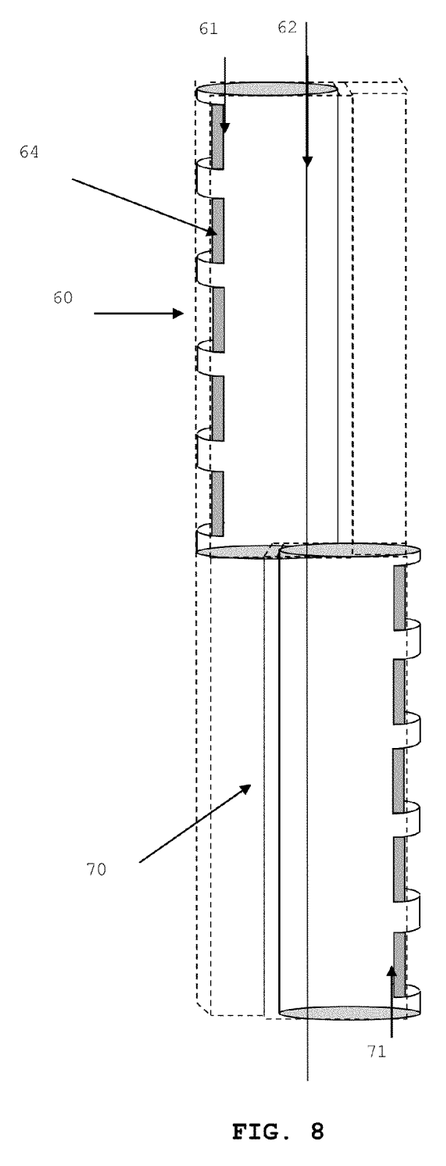
FIG. 8 schematically depicts an exemplary apparatus for curing a coated glass fiber.
Figure 9:
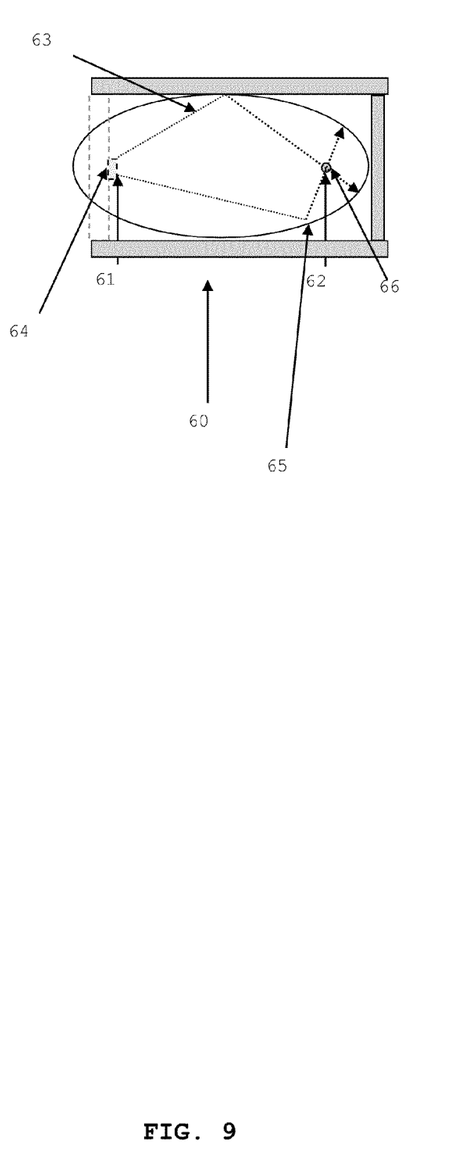
FIG. 9 schematically depicts a cross-sectional view of an exemplary apparatus for curing a coated glass fiber.

In accordance with the foregoing, FIGS. 8-9 depict an exemplary apparatus 60 for curing a coated glass fiber 66. The apparatus 60 includes a substantially cylindrical cavity 65 having an elliptical shape and having a reflective inner surface. The cavity 65 defines a first line focus 61 and a second line focus 62. A plurality of UVLEDs 64 are positioned along the first line focus 61. The second line focus 62 further defines a curing axis along which a coated glass fiber 66 passes so it can be cured. As depicted in FIG. 9, UV rays 63 emitted from the UVLEDs 64 may reflect off the inner surface of the cavity 65 such that the reflected UV rays 63 are incident to the coated glass fiber 66. To facilitate uniform curing of the coated glass fiber 66, some of the UVLEDs 64 may be differently oriented. For example, a second apparatus 70 for curing a glass fiber could have a different orientation than the apparatus 60 (e.g., the second apparatus 70 may have UVLEDs positioned along a line focus 71 that differs from the first line focus 61).

In an alternative exemplary embodiment, rather than placing the UVLEDs along one of the line foci, each UVLED may include a lens for focusing emitted UV radiation. In particular, each lens may have a focus at one of the two line foci (e.g., the line focus not defining a curing axis). By including a lens with each UVLED, the efficiency of the apparatus can be further improved.

An apparatus as described herein may include a dark space between one or more UVLEDs. In other words, the apparatus may include a space in which substantially no UV radiation is incident to the optical fiber being cured. A pause in the curing process provided by a dark space can help to ensure even and efficient curing of the optical fiber coatings. In particular, a dark space may be useful in preventing too many free radicals from being present in a glass-fiber coating before it is cured (i.e., dark space helps to control free-radical generation).

For example, it may be desirable to initially expose an optical fiber to low power UV radiation and then pass the optical fiber through a dark space. After the optical fiber passes through a dark space, it is exposed to higher power UV radiation to complete the curing process. A curing apparatus employing dark space is disclosed in commonly assigned U.S. Pat. No. 7,322,122 for a *Method and Apparatus for Curing a Fiber Having at Least Two Fiber Coating Curing Stages*, which is hereby incorporated by reference in its entirety.

An apparatus for curing glass-fiber coatings may include a control circuit for controlling the UV radiation output from the UVLED. The control circuit may be used to vary the intensity of the UV radiation as an optical fiber progresses through the apparatus.

For example, to ensure that the optical fiber receives a consistent dose of ultraviolet radiation, the UV radiation output of the UVLEDs may vary with the speed at which the optical fiber passes through the apparatus. That is to say, at higher speeds (i.e., the speed the optical fiber passes through the apparatus) the output intensity of the UVLEDs may be greater than the output intensity at lower speeds. The output intensity of the UVLEDs may be controlled by reducing (or increasing) the current flowing to the UVLEDs.

In another aspect, the present invention embraces a method of employing the foregoing apparatus to cure a coating on a glass fiber (i.e., in situ curing).

In an exemplary method, a glass fiber is drawn from an optical preform and coated with a UV curable material. UV radiation is emitted from one or more sources of electromagnetic radiation (e.g., one or more UVLEDs) toward a curing space (e.g., in the general direction of the coated glass fiber). A portion, if not most, of the emitted UV radiation is transmitted entirely through the curing space. Typically, at least some, if not most, of the UV radiation transmitted entirely through the curing space (i.e., at least some UV radiation that has not been absorbed) is reflected (e.g., with a mirror) toward the curing space. A glass fiber having an incompletely cured coating is continuously passed through the curing space to effect the absorption of emitted and reflected UV radiation. The absorption of the UV radiation cures the glass-fiber coating. Moreover, and in accordance with the foregoing, to improve the curing rate, at least a portion of the reflected UV radiation may be focused on the glass fiber (e.g., by using a concave mirror to reflect UV radiation toward the curing space's curing axis).

In accordance with the foregoing, the resulting optical fiber includes one or more coating layers (e.g., a primary coating and a secondary coating). At least one of the coating layers—typically the secondary coating—may be colored and/or possess other markings to help identify individual fibers. Alternatively, a tertiary ink layer may surround the primary and secondary coatings.

For example, the resulting optical fiber may have one or more coatings (e.g., the primary coating) that comprise a UV-curable, urethane acrylate composition. In this regard, the primary coating may include between about 40 and 80 weight percent of polyether-urethane acrylate oligomer as well as photoinitiator, such as LUCIRIN® TPO, which is commercially available from BASF. In addition, the primary coating typically includes one or more oligomers and one or more monomer diluents (e.g., isobornyl acrylate), which may be included, for instance, to reduce viscosity and thereby promote processing. Exemplary compositions for the primary coating include UV-curable urethane acrylate products provided by DSM Desotech (Elgin, Ill.) under various trade names, such as DeSolite® DP 1011, DeSolite® DP 1014, DeSolite® DP 1014XS, and DeSolite® DP 1016.

Those having ordinary skill in the art will recognize that an optical fiber with a primary coating (and an optional secondary coating and/or ink layer) typically has an outer diameter of between about 235 microns and about 265 microns (μm). The component glass fiber itself (i.e., the glass core and surrounding cladding layers) typically has a diameter of about 125 microns, such that the total coating thickness is typically between about 55 microns and 70 microns.

With respect to an exemplary optical fiber achieved according to the present curing method, the component glass fiber may have an outer diameter of about 125 microns. With respect to the optical fiber's surrounding coating layers, the primary coating may have an outer diameter of between about 175 microns and about 195 microns (i.e., a primary coating thickness of between about 25 microns and 35 microns) and the secondary coating may have an outer diameter of between about 235 microns and about 265 microns (i.e., a secondary coating thickness of between about 20 microns and 45 microns). Optionally, the optical fiber may include an outermost ink layer, which is typically between two and ten microns thick.

In an alternative embodiment, the resulting optical fiber may possess a reduced diameter (e.g., an outermost diameter between about 150 microns and 230 microns). In this alternative optical fiber configuration, the thickness of the primary coating and/or secondary coating is reduced, while the diameter of the component glass fiber is maintained at about 125 microns. By way of example, in such embodiments the primary coating layer may have an outer diameter of between about 135 microns and about 175 microns (e.g., about 160 microns), and the secondary coating layer may have an outer diameter of between about 150 microns and about 230 microns (e.g., more than about 165 microns, such as 190-210 microns or so). In other words, the total diameter of the optical fiber is reduced to less than about 230 microns (e.g., about 200 microns).

Exemplary coating formulations for use with the apparatus and method described herein are disclosed in the following commonly assigned applications, each of which is incorporated by reference in its entirety: U.S. patent application No. 61/112,595 for a *Microbend-Resistant Optical Fiber*, filed Nov. 7, 2008, (Overton); International Patent Application Publication No. WO 2009/062131 A1 for a *Microbend-Resistant Optical Fiber*, (Overton); U.S. Patent Application Publication No. US2009/0175583 A1 for a *Microbend-Resistant Optical Fiber*, (Overton); and U.S. patent application Ser. No. 12/614,011 for a *Reduced-Diameter Optical Fiber*, filed Nov. 6, 2009, (Overton).

To supplement the present disclosure, this application incorporates entirely by reference the following commonly assigned patents, patent application publications, and patent applications: U.S. Pat. No. 4,838,643 for a *Single Mode Bend Insensitive Fiber for Use in Fiber Optic Guidance Applications* (Hodges et al.); U.S. Pat. No. 7,623,747 for a *Single Mode Optical Fiber* (de Montmorillon et al.); U.S. Pat. No. 7,587,111 for a *Single-Mode Optical Fiber* (de Montmorillon et al.); U.S. Pat. No. 7,356,234 for a *Chromatic Dispersion Compensating Fiber* (de Montmorillon et al.); U.S. Pat. No. 7,483,613 for a *Chromatic Dispersion Compensating Fiber* (de Montmorillon et al.); U.S. Pat. No. 7,555,186 for an *Optical Fiber* (Flammer et al.); U.S. Patent Application Publication No. US2009/0252469 A1 for a *Dispersion-Shifted Optical Fiber* (Sillard et al.); U.S. patent application Ser. No. 12/098,804 for a *Transmission Optical Fiber Having Large Effective Area* (Sillard et al.), filed Apr. 7, 2008; U.S. Patent Application Publication No. US2009/0279835 A1 for a *Single-Mode Optical Fiber Having Reduced Bending Losses*, filed May 6, 2009, (de Montmorillon et al.); U.S. Patent Application Publication No. US2009/0279836 A1 for a *Bend-Insensitive Single-Mode Optical Fiber*, filed May 6, 2009, (de Montmorillon et al.); U.S. patent application Ser. No. 12/489,995 for a *Wavelength Multiplexed Optical System with Multimode Optical Fibers*, filed Jun. 23, 2009, (Lumineau et al.); U.S. patent application Ser. No. 12/498,439 for a *Multimode Optical Fibers*, filed Jul. 7, 2009, (Gholami et al.); U.S. patent application Ser. No. 12/614,172 for a *Multimode Optical System*, filed Nov. 6, 2009, (Gholami et al.); U.S. patent application Ser. No. 12/617,316 for an *Amplifying Optical Fiber and Method of Manufacturing*, filed Nov. 12, 2009, (Pastouret et al.) U.S. patent application Ser. No. 12/629,495 for an *Amplifying Optical Fiber and Production Method*, filed Dec. 2, 2009, (Pastouret et al.); U.S. patent application Ser. No. 12/633,229 for an *Ionizing Radiation-Resistant Optical Fiber Amplifier*, filed Dec. 8, 2009, (Regnier et al.); and U.S. patent application Ser. No. 12/636,277 for a *Buffered Optical Fiber*, filed Dec. 11, 2009, (Testu et al.).

To supplement the present disclosure, this application further incorporates entirely by reference the following commonly assigned patents, patent application publications, and patent applications: U.S. Pat. No. 5,574,816 for *Polypropylene-Polyethylene Copolymer Buffer Tubes for Optical Fiber Cables and Method for Making the Same*; U.S. Pat. No. 5,717,805 for *Stress Concentrations in an Optical Fiber Ribbon to Facilitate Separation of Ribbon Matrix Material*; U.S. Pat. No. 5,761,362 for *Polypropylene-Polyethylene Copolymer Buffer Tubes for Optical Fiber Cables and Method for Making the Same*; U.S. Pat. No. 5,911,023 for *Polyolefin Materials Suitable for Optical Fiber Cable Components*; U.S. Pat. No. 5,982,968 for *Stress Concentrations in an Optical Fiber Ribbon to Facilitate Separation of Ribbon Matrix Material*; U.S. Pat. No. 6,035,087 for an *Optical Unit for Fiber Optic Cables*; U.S. Pat. No. 6,066,397 for *Polypropylene Filler Rods for Optical Fiber Communications Cables*; U.S. Pat. No. 6,175,677 for an *Optical Fiber Multi-Ribbon and Method for Making the Same*; U.S. Pat. No. 6,085,009 for *Water Blocking Gels Compatible with Polyolefin Optical Fiber Cable Buffer Tubes and Cables Made Therewith*; U.S. Pat. No. 6,215,931 for *Flexible Thermoplastic Polyolefin Elastomers for Buffering Transmission Elements in a Telecommunications Cable*; U.S. Pat. No. 6,134,363 for a *Method for Accessing Optical Fibers in the Midspan Region of an Optical Fiber Cable*; U.S. Pat. No. 6,381,390 for a *Color-Coded Optical Fiber Ribbon and Die for Making the Same*; U.S. Pat. No. 6,181,857 for a *Method for Accessing Optical Fibers Contained in a Sheath*; U.S. Pat. No. 6,314,224 for a *Thick-Walled Cable Jacket with Non-Circular Cavity Cross Section*; U.S. Pat. No. 6,334,016 for an *Optical Fiber Ribbon Matrix Material Having Optimal Handling Characteristics*; U.S. Pat. No. 6,321,012 for an *Optical Fiber Having Water Swellable Material for Identifying Grouping of Fiber Groups*; U.S. Pat. No. 6,321,014 for a *Method for Manufacturing Optical Fiber Ribbon*; U.S. Pat. No. 6,210,802 for *Polypropylene Filler Rods for Optical Fiber Communications Cables*; U.S. Pat. No. 6,493,491 for an *Optical Drop Cable for Aerial Installation*; U.S. Pat. No. 7,346,244 for a *Coated Central Strength Member for Fiber Optic Cables with Reduced Shrinkage*; U.S. Pat. No. 6,658,184 for a *Protective Skin for Optical Fibers*; U.S. Pat. No. 6,603,908 for a *Buffer Tube that Results in Easy Access to and Low Attenuation of Fibers Disposed Within Buffer Tube*; U.S. Pat. No. 7,045,010 for an *Applicator for High-Speed Gel Buffering of Flextube Optical Fiber Bundles*; U.S. Pat. No. 6,749,446 for an *Optical Fiber Cable with Cushion Members Protecting Optical Fiber Ribbon Stack*; U.S. Pat. No. 6,922,515 for a *Method and Apparatus to Reduce Variation of Excess Fiber Length in Buffer Tubes of Fiber Optic Cables*; U.S. Pat. No. 6,618,538 for a *Method and Apparatus to Reduce Variation of Excess Fiber Length in Buffer Tubes of Fiber Optic Cables*; U.S. Pat. No. 7,322,122 for a *Method and Apparatus for Curing a Fiber Having at Least Two Fiber Coating Curing Stages*; U.S. Pat. No. 6,912,347 for an *Optimized Fiber Optic Cable Suitable for Microduct Blown Installation*; U.S. Pat. No. 6,941,049 for a *Fiber Optic Cable Having No Rigid Strength Members and a Reduced Coefficient of Thermal Expansion*; U.S. Pat. No. 7,162,128 for *Use of Buffer Tube Coupling Coil to Prevent Fiber Retraction*; U.S. Pat. No. 7,515,795 for a *Water-Swellable Tape, Adhesive-Backed for Coupling When Used Inside a Buffer Tube* (Overton et al.); U.S. Patent Application Publication No. 2008/0292262 for a *Grease-Free Buffer Optical Fiber Buffer Tube Construction Utilizing a Water-Swellable, Texturized Yarn* (Overton et al.); European Patent Application Publication No. 1,921,478 A1, for a *Telecommunication Optical Fiber Cable* (Tatat et al.); U.S. Pat. No. 7,570,852 for an *Optical Fiber Cable Suited for Blown Installation or Pushing Installation in Microducts of Small Diameter* (Nothofer et al.); U.S. Patent Application Publication No. US 2008/0037942 A1 for an *Optical Fiber Telecommunications Cable* (Tatat); U.S. Pat. No. 7,599,589 for a *Gel-Free Buffer Tube with Adhesively Coupled Optical Element* (Overton et al.); U.S. Pat. No. 7,567,739 for a *Fiber Optic Cable Having a Water-Swellable Element* (Overton); U.S. Patent Application Publication No. US2009/0041414 A1 for a *Method for Accessing Optical Fibers within a Telecommunication Cable* (Lavenne et al.); U.S. Patent Application Publication No. US2009/0003781 A1 for an *Optical Fiber Cable Having a Deformable Coupling Element* (Parris et al.); U.S. Patent Application Publication No. US2009/0003779 A1 for an *Optical Fiber Cable Having Raised Coupling Supports* (Parris); U.S. Patent Application Publication No. US2009/0003785 A1 for a *Coupling Composition for Optical Fiber Cables* (Parris et al.); U.S. Patent Application Publication No. US2009/0214167 A1 for a *Buffer Tube with Hollow Chan-*

*nels*, (Lookadoo et al.); U.S. patent application Ser. No. 12/466,965 for an *Optical Fiber Telecommunication Cable*, filed May 15, 2009, (Tatat); U.S. patent application Ser. No. 12/506,533 for a *Buffer Tube with Adhesively Coupled Optical Fibers and/or Water-Swellable Element*, filed Jul. 21, 2009, (Overton et al.); U.S. patent application Ser. No. 12/557,055 for an *Optical Fiber Cable Assembly*, filed Sep. 10, 2009, (Barker et al.); U.S. patent application Ser. No. 12/557,086 for a *High-Fiber-Density Optical Fiber Cable*, filed Sep. 10, 2009, (Louie et al.); U.S. patent application Ser. No. 12/558,390 for a *Buffer Tubes for Mid-Span Storage*, filed Sep. 11, 2009, (Barker); U.S. patent application Ser. No. 12/614,692 for *Single-Fiber Drop Cables for MDU Deployments*, filed Nov. 9, 2009, (Overton); U.S. patent application Ser. No. 12/614,754 for *Optical-Fiber Loose Tube Cables*, filed Nov. 9, 2009, (Overton); U.S. patent application Ser. No. 12/615,003 for a *Reduced-Size Flat Drop Cable*, filed Nov. 9, 2009, (Overton et al.); U.S. patent application Ser. No. 12/615,106 for *ADSS Cables with High-Performance Optical Fiber*, filed Nov. 9, 2009, (Overton); U.S. patent application Ser. No. 12/615,698 for *Reduced-Diameter Ribbon Cables with High-Performance Optical Fiber*, filed Nov. 10, 2009, (Overton); U.S. patent application Ser. No. 12/615,737 for a *Reduced-Diameter, Easy-Access Loose Tube Cable*, filed Nov. 10, 2009, (Overton); U.S. patent application Ser. No. 12/642,784 for a *Method and Device for Manufacturing an Optical Preform*, filed Dec. 19, 2009, (Milicevic et al.); and U.S. patent application Ser. No. 12/648,794 for a *Perforated Water-Blocking Element*, filed Dec. 29, 2009, (Parris).

In the specification and/or figures, typical embodiments of the invention have been disclosed. The present invention is not limited to such exemplary embodiments. The figures are schematic representations and so are not necessarily drawn to scale. Unless otherwise noted, specific terms have been used in a generic and descriptive sense and not for purposes of limitation.

The invention claimed is:

1. A method for curing a coating on a glass fiber, comprising:
    emitting UV radiation from one or more sources of electromagnetic radiation toward a curing space;
    focusing with a lens at least some of the emitted UV radiation toward a curing axis within the curing space, the lens having a focal point at the curing axis;
    transmitting a portion of the lens-focused UV radiation to the curing axis; and
    passing through the curing space and along the curing axis a glass fiber having an incompletely cured coating to effect the absorption of the lens-focused UV radiation.

2. The method according to claim 1, comprising:
    transmitting a portion of the emitted UV radiation entirely through the curing space; and
    reflecting toward the curing space at least some of the UV radiation transmitted entirely through the curing space.

3. The method according to claim 2, wherein the step of reflecting at least some of the UV radiation comprises focusing at least some of the UV radiation toward the glass fiber having an incompletely cured coating using a concave mirror.

4. The method according to claim 1, wherein the step of emitting UV radiation from one or more sources of electromagnetic radiation comprises emitting UV radiation from one or more UVLEDs.

5. The method according to claim 4, wherein substantially all of the electromagnetic radiation emitted by at least one of the UVLEDs has wavelengths of between about 200 nanometers and 600 nanometers.

6. The method according to claim 4, wherein at least 80 percent of the electromagnetic radiation emitted by at least one of the UVLEDs has wavelengths within a 30 nanometer range.

7. The method according to claim 1, wherein the step of emitting UV radiation from one or more sources of electromagnetic radiation comprises emitting UV radiation from an array of UVLEDs.

8. The method according to claim 1, wherein the step of emitting UV radiation from one or more sources of electromagnetic radiation comprises emitting UV radiation from at least two UVLEDS emitting electromagnetic radiation at different output intensities.

9. The method according to claim 1, wherein the step of emitting UV radiation from one or more sources of electromagnetic radiation comprises adjusting the intensity of the emitted UV radiation in response to a change in the speed at which the coated glass fiber passes through the curing space.

10. The method according to claim 1, wherein the step of passing the glass fiber through the curing space and along the curing axis substantially cures the coating on the glass fiber.

11. A method for curing a coating on a glass fiber, comprising:
    passing through a curing space a glass fiber having an incompletely cured coating;
    emitting toward the curing space UV radiation from one or more sources of electromagnetic radiation; and
    focusing with a lens at least some of the emitted UV radiation toward the glass fiber having an incompletely cured coating such that the coated glass fiber passes through the focus of the lens to absorb at least some of the emitted UV radiation.

12. The method according to claim 11, comprising:
    transmitting the emitted UV radiation through the curing space; and
    reflecting toward the glass fiber having an incompletely cured coating at least some of the UV radiation transmitted through the curing space.

13. The method according to claim 12, wherein the step of reflecting at least some of the UV radiation comprises focusing at least some of the UV radiation toward the glass fiber having an incompletely cured coating using a parabolic mirror, a spherical mirror, and/or a cylindrical mirror.

14. The method according to claim 11, wherein the step of emitting UV radiation from one or more sources of electromagnetic radiation comprises emitting UV radiation from a UVLED device that includes a plurality of UVLEDs.

15. The method according to claim 11, wherein the step of emitting UV radiation from one or more sources of electromagnetic radiation comprises emitting UV radiation from a three-dimensional array of UVLEDs.

16. The method according to claim 11, wherein the step of emitting UV radiation from one or more sources of electromagnetic radiation comprises emitting UV radiation from one or more UVLEDs, wherein at least 80 percent of the electromagnetic radiation emitted by at least one of the UVLEDs has wavelengths within a 30 nanometer range.

17. The method according to claim 11, wherein the step of emitting UV radiation from one or more sources of electromagnetic radiation comprises emitting UV radiation from at least two UVLEDS emitting electromagnetic radiation at different output intensities.

18. The method according to claim 11, wherein the step of emitting UV radiation from one or more sources of electromagnetic radiation comprises adjusting the intensity of the emitted UV radiation in response to a change in the speed at which the coated glass fiber passes through the curing space.

19. The method according to claim 11, wherein the step of passing the glass fiber through the curing space substantially cures the coating on the glass fiber.

* * * * *